United States Patent [19]

Tateishi

[11] 3,869,129

[45] Mar. 4, 1975

[54] SPEED CHANGER FOR PHONOGRAPH RECORD PLAYER

[76] Inventor: Arthur Katsumi Tateishi, 25 Warrender Ave., Apt. 202, Islington, Ontario, Canada

[22] Filed: Dec. 10, 1973

[21] Appl. No.: 423,068

[52] U.S. Cl. .................................................. 274/9 B
[51] Int. Cl. ............................................ G11b 25/04
[58] Field of Search ........................ 274/1 R, 9, 10 S

[56] References Cited

UNITED STATES PATENTS

| | | | |
|---|---|---|---|
| 3,485,499 | 12/1969 | Fukuda | 274/9 A |
| 3,547,449 | 12/1970 | Dennis | 274/9 A |

FOREIGN PATENTS OR APPLICATIONS

| | | | |
|---|---|---|---|
| 1,044,624 | 10/1966 | Great Britain | 274/9 R |

*Primary Examiner*—Harry N. Haroian

[57] ABSTRACT

A speed changer apparatus is provided which automatically determines which of two speeds a phonograph turntable shall be driven at, depending on the record placed on the turntable. A sensing and control element is spring loaded upwardly to accommodate the large centre hole of 45 RPM records, but is depressed when a 33⅓ RPM record is placed on the turntable. The sensing element rotates with the turntable, and has a dog which interferes with a nose or shoulder element on a cam plate which has an over-centre swinging action, such that the cam plate adopts one of two positions depending on the type of record being played. An idler arm having an idler at its outer end is cam driven to either a higher or lower position depending on the position of the cam plate, and the idler engages one of two sections on the motor shaft having an appropriate diameter so as to drive the turntable at the desired speed.

In the preferred embodiment of the phonograph record player incorporating the above speed changer, an on/off volume control is placed at the centre of the turntable as a stationary spindle, where the spindle is rotatable as a volume control, but independently of the turntable, so that a low-priced record player having clustered controls can be provided.

11 Claims, 12 Drawing Figures

SPEED CHANGER FOR PHONOGRAPH RECORD PLAYER

FIELD OF THE INVENTION

This invention relates to phonograph record player apparatus, and particularly an improved speed changer therefor. The present invention provides an apparatus where single records can be played on a turntable, and the speed of the turntable is automatically set at one of two speeds depending on the type of record to be played. The present invention further provides a phonograph record player having clustered controls at the centre of the turntable; and the present invention teaches an improved enclosure, a solderless connector, and an improved transformer construction for use in such apparatus as phonograph record players.

BACKGROUND OF THE INVENTION

It has been desirable to provide a low-priced phonograph record player having simplified controls and automatic speed changing between the two most common record player speeds. This has been especially relevant with respect to phonograph record players which play only one record at a time, either at 33 ⅓ RPM or 45 RPM, and which can be manufactured and sold very inexpensively. Indeed, even in much higher priced record playing apparatus, it may be desirable to have automatic speed selection between the two most common record playing speeds, so that the turntable is automatically driven at the requisite speed depending on the type of record that is placed upon it. The present invention provides such aspeed changer, which can be used in a driving apparatus for a phonograph record turntable, where the turntable is driven by an idler which in turn is driven from a vertically oriented motor shaft; and where the different driving speeds for the turntable are determined by the driving engagement of the idler with different portions of the motor shaft having different diameters.

It is an industry standard that phonograph records which are intended to be played at 45 RPM have a large centre hole which is approximately 1 ½ inches in diameter. For any phonograph record player apparatus which is intended to play phonograph records at other speeds as well as 45 RPM — usually 33 ⅓ RPM — it is necessary that either the record be provided with an adapter which fits into the centre hole and which in turn fits over a standard turntable spindle, or that there be a large-diameter adapter provided with the turntable so that, in any event, a 45 RPM record is properly centred on the turntable for playing. It has been known, in the past, to provide "pop-up" 45 RPM record adapters with turntables, where the adapter is a ring or post of the appropriate diameter which is spring biased upwardly and remains in its upper position unless a 33 ⅓ RPM record is placed on the turntable, at which time the weight of the 33 ⅓ RPM record depresses the 45 RPM adapter. However, in the past, such phonograph record playing apparatus that has been provided with a "pop-up" 45 RPM record adapter has, in any event, speed changing controls of the conventional type. Such conventional speed-changing controls have, for single-play record turntables, comprised levers or rotatable knobs placed to one side of the turntable which, when actuated, have either changed the elevation of the idler or of the motor shaft so as to place the idler into driving contact with the appropriate portion of the motor shaft having the requisite diameter so as to drive the turntable at the desired speed. [Some automatic record players are adapted to play a plurality of records at one time when the records are stacked on a tall spindle, and some such record players have in the past been provided with feelers to sense a 7 inches diameter record and to actuate a lever to place the idler on 45 RPM driving position, as otherwise the record player turntable is driven at 33 ⅓ RPM. Such automatic speed changing apparatus is, however, dependent upon the sensing of the diameter of a record that is being played, where the record fits over a standard small spindle.]

It has been determined that sufficient driving force can be provided by the motor shaft of a constant speed phonograph motor to an idler wheel, and thence to the turntable so that the turntable can drive a speed changer mechanism. The present invention therefore provides a driven speed changer mechanism, where the speed at which the turntable is to be played is determined by the presence or absence of a 45 RPM record on the turntable, and therefore by the elevated or depressed position of a sensing and control element which also functions as a "pop-up" 45 RPM record adapter. A speed change function of the speed changer of the present invention is initiated by the interference of a dog associated with the control or sensing element and one of a nose or a shoulder portion which are situated on a speed changing cam plate which adopts one of two positions, and is swung by an over-centre action into either of those positions. Whether the speed-changing cam plate swings from one position to the other depends on the relative position of either of the nose or shoulder portions thereof with respect to the dog, as the dog orbits about the axis of rotation of turntable; and if the dog interferes with either of the nose or shoulder portions of the cam plate, there is sufficient driving force transferred to the dog from the turntable to drive the speed-changing cam plate through its over-centre action to its other position.

In the usual turntable drive mechanisms of the prior art, where the turntable is driven by an idler which in turn is driven by a vertically oriented motor shaft, there is no relief of the driving pressure exerted against the motor shaft by the idler wheel when it is turned off. Thus, if such apparatus is permitted to stand for any prolonged period of time, there is a possibility of bumps or flat spots developing in the periphery of the idler wheel. Such bumps or flat spots might then be noticable at the next time that the turntable is played because of an unevenness of the driving speed of the turntable. It has sometimes been the practice to provide for retraction of the idler away from the motor shaft in expensive phonograph turntable apparatus; but the present invention provides for idler retraction in an inexpensive apparatus. More especially, the present invention provides for idler retraction automatically, whenever the apparatus is turned off.

It has always been a matter of some concern and particularly a matter of concern about production costs that open wiring of motor and switch leads at line voltage (usually 110–120 volts) has not been permitted as a mattter of safety. Expensive switch elements have been required, and expensive and time consuming spade or clip-type connectors used where, indeed, connections were not soldered and taped. The present invention provides a structure whereby all of the high voltage wiring can be accommodated within a closed or sealed compartment when the turntable is in place. By assembling a phonograph record player apparatus with simple solderless connections and open wiring of line voltage and switch leads, appreciable savings in material and assembly costs can be made. The savings are accomplished, in part, by the incorporation into the present invention of a novel switch structure, by the use of a novel transformer structure, and by eliminating the necessity for incorporating an "on-off" electrical switch with a preamplifier or amplifier. These savings can also be accomplished, particularly in lower priced units, by incorporating the volume control on the same shaft that controls the on-off electrical switch, and which also functions as a spindle for 33 ⅓ RPM records; so that the function controls of the unit are clustered at the centre of the turntable.

Still further, it is sometimes desirable to provide a function control which has an intermediate position that permits supply of power to a low voltage amplifier/preamplifier and tuner without causing a driving engagement of the idler with the motor shaft. Thus, the present invention provides a cam switch having upper and lower profiles, either of which operates against a single cam follower which is spring biased against the cam switch by a leaf spring contact arm of the electrical switch, depending upon the upwards or downwards orientation of the specific profile of the cam switch as it is assembled to the control shaft. In this way, a radio tuner can be played through the amplifier/preamplifier which would be incorporated into a phonograph record playing apparatus in accordance with a preferred embodiment to this invention, without driving the turntable and while keeping the idler in a retracted position.

BRIEF SUMMARY OF THE INVENTION

It is an object of this invention to provide a speed changer for phonograph record playing apparatus where the speed at which the turntable is driven is determined by the nature of the record which is placed upon the turntable and is automatically adjusted to one of two standard phonograph record playing speeds.

Another object of this invention is to provide a record playing apparatus which can be easily and inexpensively assembled; and where most of the components of the apparatus can be inexpensively produced from injection-moulded plastic.

Yet another object of this invention is to provide a phonograph record playing apparatus where open wiring at line voltage can be provided within an enclosed compartment, without risk of danger to a user of the apparatus.

A feature of this invention is the provision of an improved solderless connector for effecting a connection between two wires.

Another feature of this invention is a transformer structure which provides for a safe, low voltage winding on a bobbin which is electromagnetically linked but electrically isolated from a primary winding, which is securely and safely enclosed within the bobbin without the necessity of taping.

Yet another feature of this invention is the incorporation of a transformer structure as spoken above with a phonograph motor, where the core of the transformer also forms the stater frame for the motor.

BRIEF DESCRIPTION OF THE DRAWINGS

These and other objects and features of this invention are more fully discussed hereafter, in association with the accompanying drawings, in which.

DESCRIPTION OF THE PREFERRED EMBODIMENTS

It will be assumed in the discussion that follows that reference to a first position of an idler, dog or cam plate, or a first elevation of the dog, of a first portion of a motor shaft, refers in each instance to the position that the element must have or assume in order that the turntable of the phonograph record playing apparatus according to this invention may operate at 45 RPM; and likewise, that reference to a second position, elevation or portion of any of those elements is reference to the position that the element must have or assume in order that the turntable be driven at 33 ⅓ RPM. Other record playing speeds may, of course, be accommodated as discussed herefter, but 45 and 33 ⅓ RPM are the most common industry standards for long-playing phonograph records.

Figure 1:
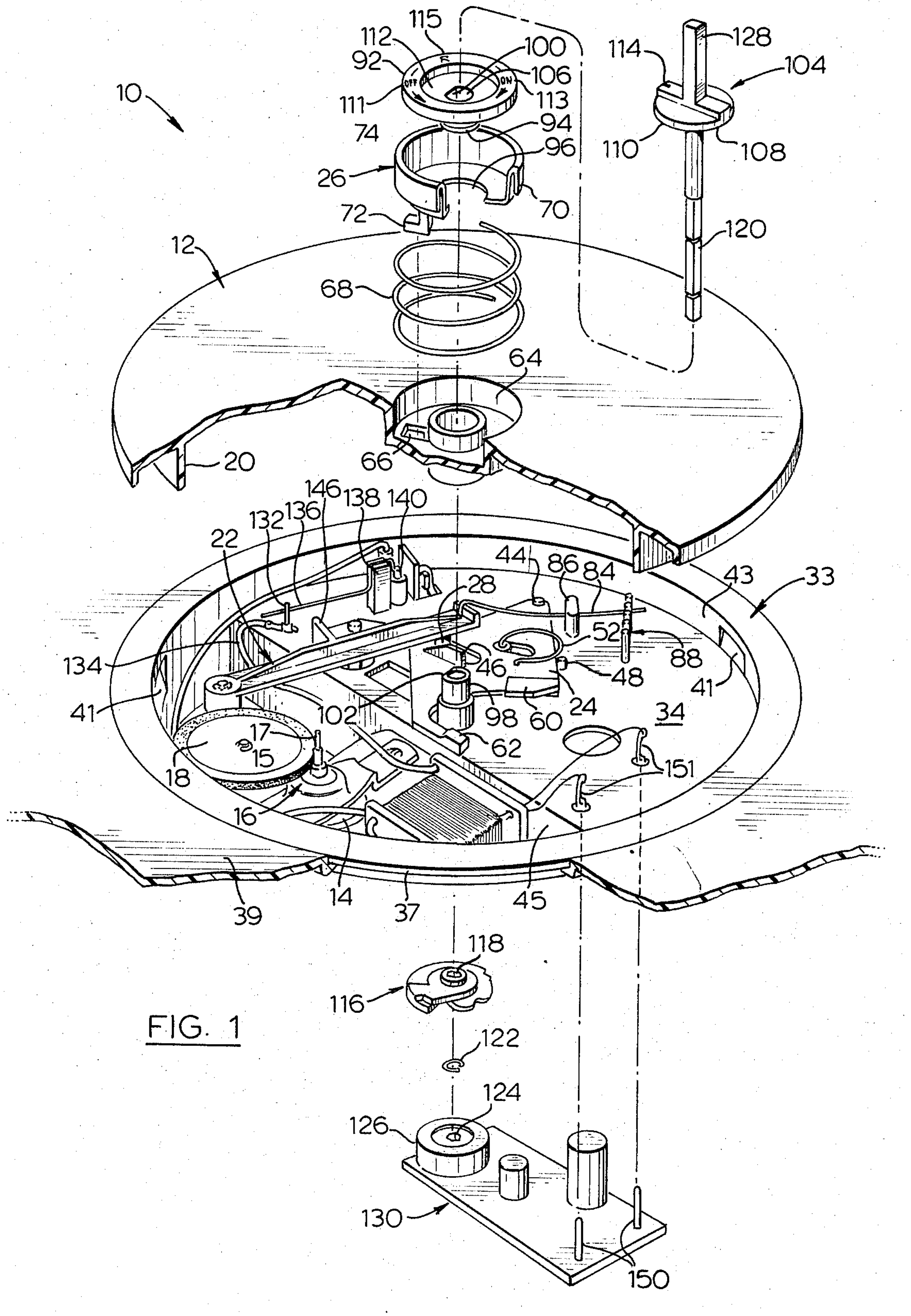
FIG. 1 is an exploded view of a phonograph record playing apparatus according to the present invention.

FIG. 1 shows an apparatus 10 for playing phonograph records, which apparatus includes a turntable 12, a constant speed phonograph motor 14 having a vertically oriented motor shaft indicated generally at 16 and a horizontally disposed idler wheel 18. The idler wheel 18 is driven from the motor shaft 16, which drives against a vertical inner wall 20 on the turntable. The motor shaft has a lower portion 15 and an upper portion 17, which have different diameters, and the diameters of the portions 15 and 17 are chosen having regard to the speed at which the constant speed motor 14 drives the shaft 16, so that driving contact of the idler 18 with either of motor shaft portions 15 or 17 will drive the turntable 12 at 45 RPM or 33 ⅓ RPM, respectively. As noted, by choosing different diameters for the motor shaft 16, different driving speeds for the turntable 12 can be accommodated.

Figure 2:
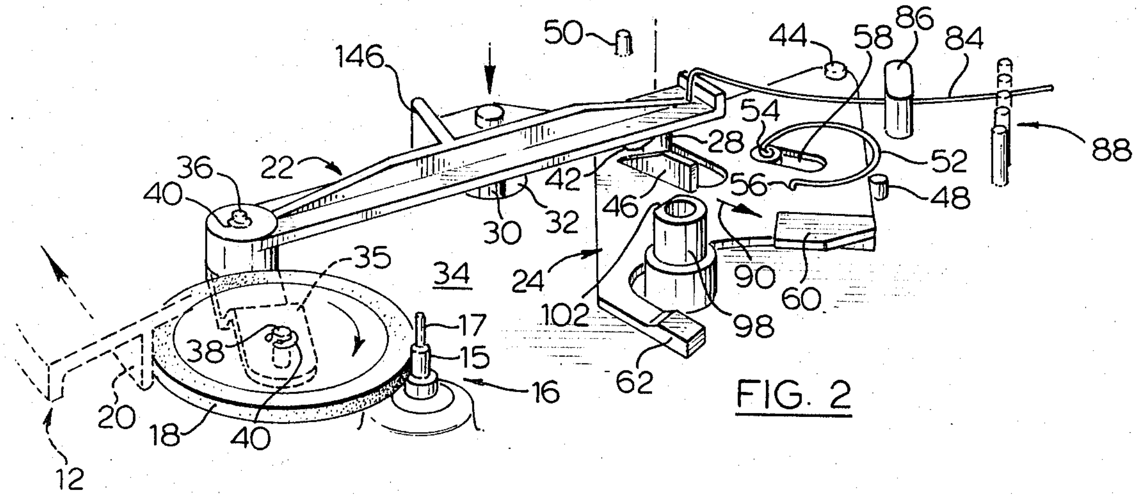
FIG. 2 is a partial, perspective view of certain of the components of the speed changer portion of the present invention in a first position.
Figure 3:
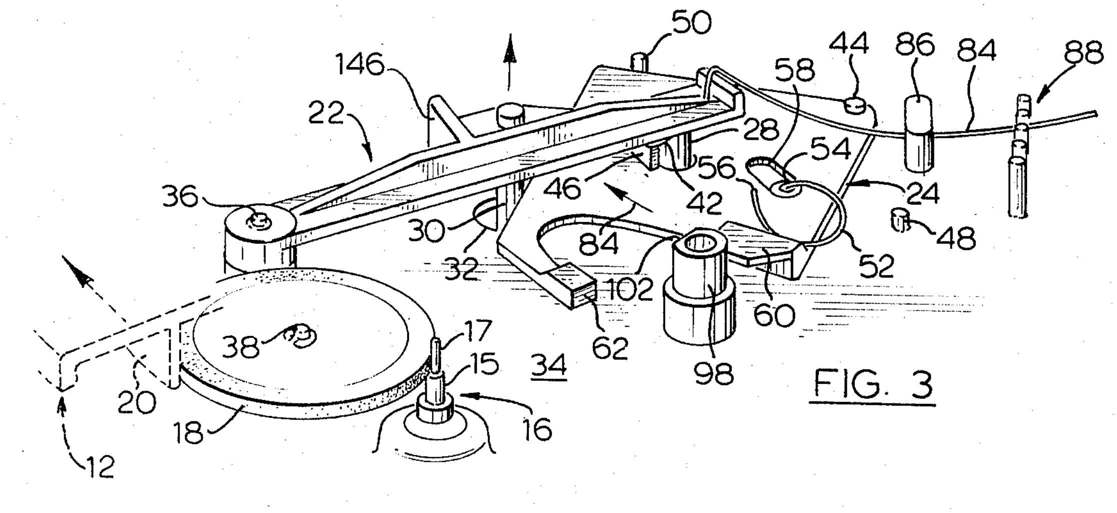
FIG. 3 is a view similar to FIG. 2 with the components in a second position.

The purpose of any speed changer for a phonograph turntable of the sort shown in FIG. 1, where the idler 18 must drive against either a first or a second motor shaft portions 15 and 17 respectively to achieve the desired driving speed of the turntable 12, is to position the idler 18 against the motor shaft 16 at the requisite elevation thereon. Thus, the speed changer of the present invention provides means whereby the elevation of the idler 18 maybe altered; and as discussed in greater detail hereafter, the determination of the elevation of the idler 18 can be made automatically by sensing the nature of the phonograph record placed on the turntable 12. The major components of the speed changer of the present invention include an idler arm 22, a speed changer cam plate 24, and a control element 26. The idler arm 22 is generally horizontally disposed, but is mounted for vertical movement from a first, lower position to a second, higher position. The vertical movement of the idler arm is accommodated on a pin 28 at one end thereof, as shown in FIGS. 2 and 3, about which a swinging movement of the idler arm in a horizontal plane may also be accommodated, as discussed in greater detail hereafter. There is formed on the underside of the idler arm, a post 30 which extends through an opening 32 in the plate 34 of the base compartment 33 in which the turntable driving and speed change mechanism according to this invention is installed. The idler 18 is carried at the end of the idler arm 22, by a bracket 35 secured to the idler arm by pin 36. The idler 18 may suitably be secured to the bracket 35 by pin 38, and pins 36 and 38 maybe secured by clip washers 40. A bearing cam follower 42 is formed on the underside of the idler arm 22.

The cam plate 24 is mounted for swinging movement in a horizontal plane about a pin 44, which may be formed in the bottom plate 34 and upstanding therefrom. The cam plate 24 has a ramp-type cam 46 formed in its upper surface; and as discussed in greater detail hereafter, it will be seen that the ramp-type cam 46 is positioned on the upper surface of the cam plate 24 for contact with the bearing cam follower 42 on the underside of idler arm 22. The cam plate 24 may swing from a first to a second position, and vice versa; where the first position is shown in FIGS. 1 and 2 and is defined where the cam plate rests against a stop 48, and the second position is defined where the cam plate rests against a stop 50. Each of stops 48 and 50 are conveniently formed and upstanding from the bottom plate 34. Movement of the cam plate 24 between its first and second positions is accomplished by an over-centre action, which in turn is achieved by virtue of a single coil spring 52 which is secured at one end 54 to the bottom plate 34 and at its other end 56 to the cam plate 24. A slot 58 is formed in the cam plate 24 to accommodate its swinging movement past end 54 of spring 52.

There is formed on cam plate 24 a shoulder portion 60 and a nose portion 62. The shoulder portion 60 is at a first elevation relative to the base plate 34 and relative to the turntable 12, and is to one side of the axis of rotation of the turntable. The nose portion 62 is at a second elevation which is lower than the elevation of the shoulder portion 60, and is remote from the shoulder portion 60.

The turntable 12 has a recess 64 formed at its centre, and an opening 66 is made through the base of the recess 64. A coil spring 68 is received into the recess 64, and also into a downturned lip portion 70 in the control element 26. A dog 72 extends downwardly from the bottom portion of the control element 26, through the opening 66 in the base of recess 64; so that when the control element 26 is placed in the recess 64, the dog 72 extends below the turntable, and the control element 26 is driven in rotation with the turntable so that the dog 72 has an orbital movement around the axis of rotation of the turntable. The coil spring 68 is provided to bias the control element upwardly to a first, higher position, but permits vertical movement downwardly of the control element to a second, lower position when the weight of a phonograph record bears downwardly against the upper surface 74 of the control element 26.

Figures 4, 5:
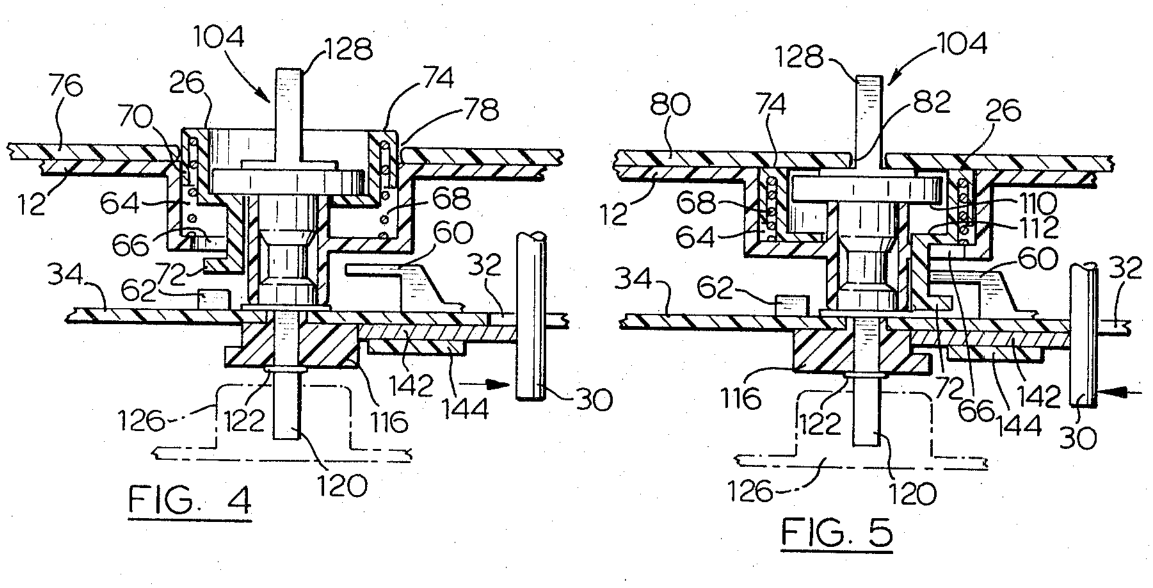
FIG. 4 shows at its upper half, the relationship of certain components of the speed changer mechanism in a first position, in cross-section, and its lower half the relationship of certain of the switch components.
FIG. 5 is a view similar to FIG. 4, showing certain of the same components in different positions and orientations.

Assuming that a driving condition exists between the idler 18 and the turntable 12, the operation of the speed changer mechanism according to this invention can now be discussed in detail. As noted above, the dog 72 is adapted to have orbital movement around the axis of rotation of the turntable 12, and the dog 72 extends below the base of the recess 64 formed at the centre of the turntable 12. When a record having a centre-hole which is slightly larger than the diameter of the control element 26 is placed on the turntable and centred properly, the control element 26 extends upwardly through the centre hole of the record. This is shown in FIG. 4 where a phonograph record 76 having a centre hole 78 is shown placed on turntable 12 with the control element 26 extending upwardly through the centre-hole 78. In that circumstance, the dog 72 is shown at substantially the same elevation as the elevation of the shoulder portion 60 of the cam plate 24.

Likewise, as shown in FIG. 5, a phonograph record 80 having centre hole 82 may be placed on the turntable 12; and because the centre hole 82 of record 80 is smaller than the diameter of the control element 26, the weight of the record 80 compresses the bias spring 68 and forces the control element 26 to move to a second, lower elevation such that the elevation of the dog 72 is substantially the same elevation as the nose portion 62 of the cam plate 24. If the phonograph record 80 were to be removed from the turntable 12, bias spring 68 would force the control element 26 upwardly to assume its first position as shown in FIG. 4.

Assuming that, at the beginning of an operation, the cam plate 24 is in its first position as shown in FIGS. 1 and 2, and that a phonograph record is placed on the turntable to force the control element 26 downwardly, upon the first orbital rotation of the dog 72 around the axis of rotation of turntable 12, it would strike and interfere with the nose portion 62 of the cam plate 24. In that circumstance, the dog would continue to drive because of the driving force imparted to the turntable from the idler 18, and the nose portion 62 of the cam plate 24 would be forced to move. Continued movement of the nose portion 62 under the urging of the dog 72 would cause the cam plate 24 to swing in the direction of arrow 84 as shown in FIG. 3, and continued swinging action in that direction would cause an over-centre reaction of the cam plate 24 and spring 52 so that the cam plate 24 would very rapidly assume its second rest position as shown in FIG. 3 against stop 50. Thereafter, continued rotation of the dog 72 — which, it must be remembered, is still in the same substantial elevation as the nose portion 62 — would be unimpeded because the nose portion 62 would have moved sufficiently far away from the path of orbital movement of the dog 72 by virtue of the force of the spring 52 as the cam plate 24 was forced to its second position. Thus, so long as the record 80 remained on the turntable 12 and the control or sensing element 26 remained at its second, lower position, the dog 72 would continue its unimpeded orbital movement in substantially the same elevation as the nose portion 62 of the cam plate 24.

Referring to FIG. 3, it can be seen that as the cam plate 24 assumed its second position, the ramp-type cam 46 rod against the cam follower 42 on the underside of the idler arm 22, thereby forcing the idler arm 22 to move upwardly. A spring 84 may be provided to bias the idler arm 22 downwardly, and is held under clip 86 and between two of a plurality of pins noted generally at 88, for a purpose to be discussed hereafter. As the idler arm 22 was forced to move upwardly by the reaction against the downward biasing force of spring 84 of the upward driving force of ramp-type cam 46 moving against cam follower 42, the idler 18 also moved upwardly so as to assume an elevation requisite for driving engagement with the second driving portion 17 of the motor shaft 16. In order to maintain the idler 18 in driving engagement with the motor shaft 16, the spring 84 is placed between two of pins 88 to provide an appropriate amount of pressure between the idler 18 and the motor shaft 16; since it will be recalled that the idler arm 22 is permitted swinging motion in a horizontal plane about the pin 28, regardless of its elevation.

In like manner, if a phonograph record such as record 76 is placed on turntable 12 as shown in FIG. 4 so that the sensing element 26 assumes its first or upper position, it will be noted that the dog 72 has orbital rotation and substantially the same elevation as the shoulder portion 60 of the cam plate 24. If the cam plate 24 is in its second position as shown in FIG. 3 and the sensing element 26 is in its first position as shown in FIG. 4, then upon the first rotation of the dog 72 there will be interference between it and the shoulder portion 60. In like manner as described above, continued rotation of the dog 72 against the shoulder portion 60 will cause an over-centre movement of the cam plate 24 against stop 48 so that that cam plate 24 will assume its first position; and thereafter, there will be no interference of the dog 72 with the shoulder portion 60.

It should be noted that when the sensing element 26 and cam plate 24 are each in their first position, the dog 72 rotates above the nose portion 62 and is clear of the shoulder portion 60; whereas when the sensing element 26 and cam plate 24 are each in their second position, the dog 62 rotates beneath the shoulder portion 60 and is clear of the nose portion 62.

When the cam plate 24 swings to its first position as shown at arrow 90 in FIG. 2, the downward bias force of spring 84 beneath clip 86 causes the idler arm 22 to move downwardly, and thus the idler 18 assumes an elevation for driving relationship with first portion 15 of the motor shaft 16.

It will be seen that, so long as the turntable 12 is being driven by idler 18 from motor shaft 16, it will be driven at a speed to accommodate either of two predetermined record driving speeds, automatically. The automatic feature of the speed changer is predicated on the fact that the centre hole of phonograph records intended to be played at one of the two predetermined speeds is of a different size than the centre hole of phonograph records intended to be played at the other of the two speeds which can be selected, and thus the sensing element 26 can be made to accommodate the larger of the centre holes and to be depressed by the weight of a phonograph record having the smaller of the centre holes.

An alternative arrangement for the control element 26 can be made whereby the weight of a phonograph record placed on it will affect the operation of the control element so that its operation is dependent upon the nature of the phonograph record which it senses, and specifically the weight thereof. The coil spring 68 can be chosen so that it does not permit downward motion of the consensing element 26 beyond a certain extent so that the elevation of the dog 72 would still be above the elevation of the shoulder portion 62 of cam plate 24. In that event, a light-weight record having a central portion such that it would cause interference with the upper surface 74 of the control element 26 would not have sufficient weight to cause its depression to the position shown in FIG. 5. This can be accommodated when it is realized that 45 RPM records are 7 inches in diameter and 33 ⅓ RPM records are normally 12 inches in diameter and are much thicker so that they are much heavier than 45 RPM records It would be necessary, of course, for the upper portion 128 of control shaft 104 to extend above the record so as to function as a spindle therefor.

Returning to FIG. 1, there is shown a marker ring 92 having a lower extension 94 to pas through a hole 96 in the bottom of the sensing element 26 so that the marker ring 92 may fit over a post 98 which may be formed with or secured to the bottom plate 34. The marker ring 92 is secured against rotation by the interference of flat face 100 against the flat face 102 of the post 98. A control shaft 104 may be placed downwardly through a recess 106 in the marker ring 92; and it will be noted that the underside 108 of a disc portion 110 formed on the control shaft 104 will interfere with a bottom surface 112 formed in the marker ring 92. An indicia or other marking 114 may be formed on the disc 110 of the control shaft 104; and other indicia such as OFF and ON markings 111 and 113, or an intermediate marking 115, may be formed on the marker ring 92. It will also be noted that the control shaft 104 is mounted for rotation independently of the turntable 12, and is substantially at the axis of rotation thereof.

A rotary cam 116 is secured to the lower end of the control shaft 104; and the central recess 118 of the rotary cam 116 isshaped so as to be drivingly engaged to the likewise-shaped lower portion 120 of the control shaft 104. The rotary cam 116 may be secured to the lower portion of the control shaft 104 by the clip washer 122; and the lower portion 120 of the control shaft 104 may extend further so as to enter the central portion 124 of a volume or other control 126 which may form part of a preamplifier or preamplifier/amplifier component of the entire phonograph record playing assembly. Thus, rotation of the upper portion 128 of the control shaft 104, independently of the turntable 12, causes rotation of the rotary cam element 116 and possibly of a wiper element within control 126; and it can be seen that the control shaft 104 is mechanically connected to electrical control circuitry such as that indicated generally at 130 in FIG. 1 and also to an electrical on-off switch as discussed immediately below. It should also be noted that the upper portion 128 of control shaft 104 is profiled so that it may be easily grasped by the fingers of a person operating the record player and easily rotated; and that the greatest crosswise dimension of the upper portion 128 is less than the diameter of the centre-hole of a phonograph record such as that shown at 80 in FIG. 5. Thus, the upper portion 128 of the control shaft 104 functions as a stationary spindle for records placed on the turntable 12.

As noted in FIG. 1, there is a post 132 to which an electrical wire 134 is connected, and there is an arm 136 extending from a clip 138 to the general region of the post 132. The arm 136 forms a contact arm for an electrical switch, and is connected at solderless connection 140 to the line cord, as discussed hereafter. Likewise, the post 132 forms a second electrical contact of the electrical switch so that contact between the arm 136 and post 132 closes an electrical circuit.

Figures 6, 7, 8:
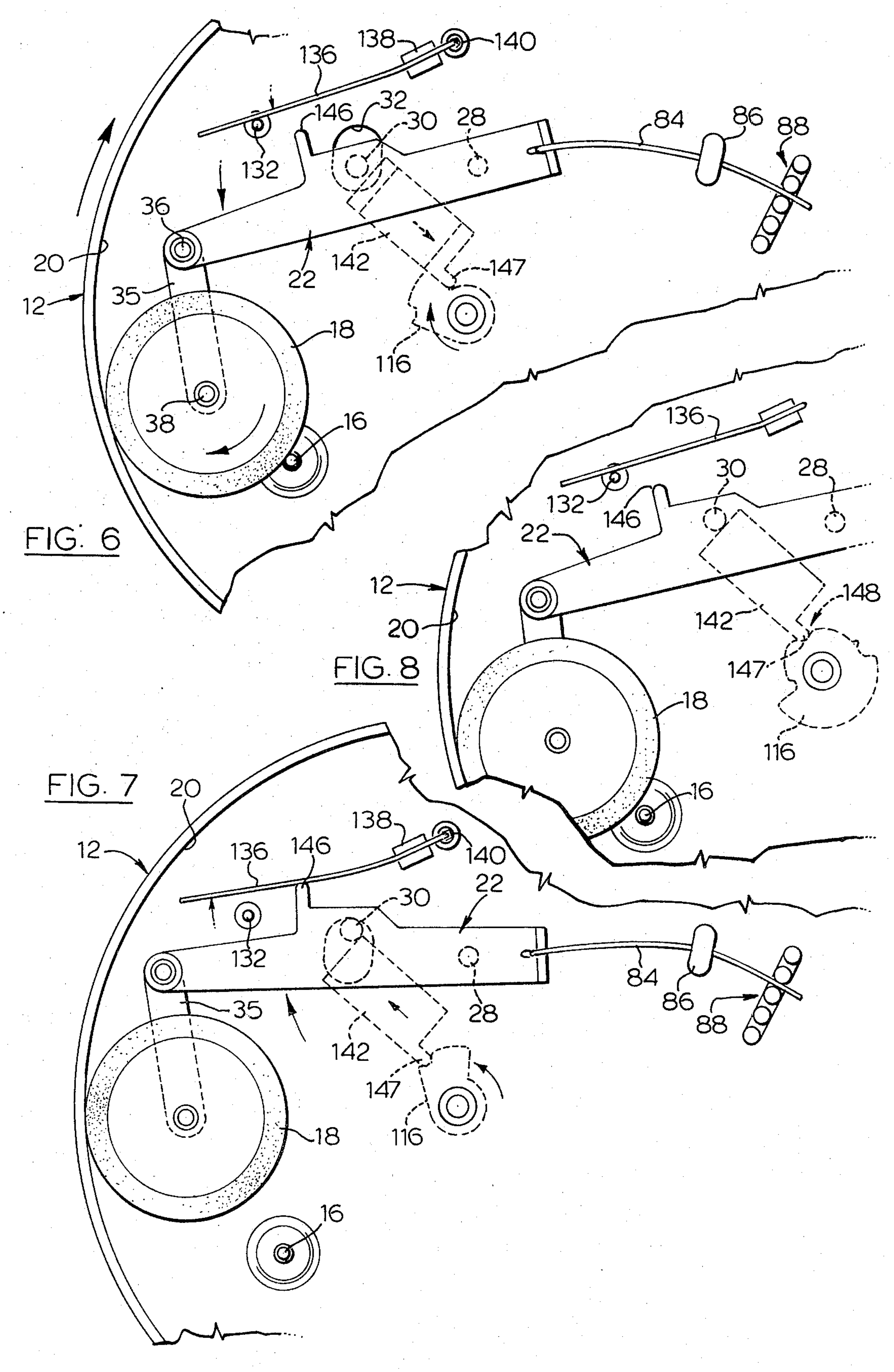
FIGS. 6 and 7 show the relationship of certain electrical switch components and cam components related therewith.
FIG. 8 shows the relationship of certain electrical switch components and a different cam component associated therewith.

The manner in which contact between the contact arm 136 and post 132 is permitted is a function of the position of the rotary cam element 116 or at least of cam positions thereon. Referring to the lower portion of FIG. 4, and to FIGS. 1 and 7, it will be seen that when the rotary cam element 116 is oriented as shown in FIG. 1, there are essentially two cam positions, "on" and "off". A cam follower element 142 is mounted beneath the bottom plate 34 and is secured for horizontal movement by a bracket 144. When the control shaft is rotated so that the rotary cam element has its off position in contact with the cam follower 142, the cam follower 142 pushes outwardly against pin 30 formed on the underside of idler arm 22, and idler arm 22 in turn pushes outwardly against contact arm 136 at nose 146. The contact arm 136 is a leaf or spring, and is biased towards the pin 132 and against the nose 146 of idler arm 22; and in addition, the spring action of spring 84 past clip 86 and from pins 88 biases the idler arm 22 for rotational movement about pin 28 in the counterclockwise direction when viewed from above. Thus, if the rotary cam element 116 is rotated so that its on position is assumed, as in FIG. 6 and 5, the combination of the bias force of spring 84 and of contact arm 136 is sufficient to cause the idler arm 22 to swing away from contact arm 136, so that electrical contact is made between the contact arm 136 and pin 132. Thus, when the rotary cam element 116 is rotated such that the cam follower 142 is no longer against the first or off position of the cam element 116, the on-off function which initiates electrical operation of the phonograph record playing apparatus according to this invention is achieved. It is also noted that FIGS. 7 and 6 that the bias force of the spring 84 is such as to urge the idler arm 22 to rotate sufficiently about pin 28 that the idler 18 is brought into driving contact with the motor shaft 16, as shown in FIG. 6 Likewise, when the rotary cam element 116 is rotated so that its off position contacts the cam follower 142, it is noted from FIGS. 4 and 7 that the cam follower 142 forces against pin 30 on the underside of idler arm 22, and retracts the idler 18 away from the motor shaft 16. The spring tension of the spring 84, acting in a horizontal direction past the bracket 86 from pins 88, provides the force of the idler acting against the motor shaft 16, and can be adjusted by moving the end of the spring 84 from between one pair of pins 88 to between another pair of pins 88.

There may, however, be circumstances where it is desirable to initiate electrical operation at least of the preamplifier/amplifier portion of the apparatus according to this invention, and perhaps so as to provide electrical power to other components such as a radio tuner, without having a driving reaction between the idler 18 and the motor shaft 16. Thus, as shown in FIG. 8, the rotary cam element 116 is provided with an intermediate, third, position indicated at 148, which is dimensioned so that the contact arm 136 is permitted to contact pin 132 to close an electrical circuit, and the idler arm 22 is permitted to swing with its pin 30 against the cam follower 142 only so far as to permit the closing of the electrical circuit between the contact arm 136 and pin 132 but not so far as to permit a driving contact between the idler 18 and the motor shaft 16. Therefore, when the rotary cam element 116 is installed on the control shaft 104 upside-down with respect to the manner in which it is shown in FIG. 1, an intermediate "on" electrical position of index 114 is permitted, without a mechanical driving engagement of idler 18 and motor shaft 16 so as to drive the turntable 12. That intermediate position may be such that the index 114 is opposite marking 115 on marker ring 92, and be secured there by the spring force of the cam follower 144 against rotary cam 116 with its nose 147 held by the detent formed in the rotary cam 116 at 148.

It will be seen that the pin 132 and contact arm 136 are "open" wiring; and that when they are out of contact with each other and the line cord is connected, line voltage exists between them. However, because the recess into which the motor and the electrical on-off switch are placed is a closed compartment when the record playing apparatus is finally assembled for use and sale, there is no danger to a user. A preamplifier or preamplifier/amplifier component such as that indicated at 130 in FIG. 1 may be installed below the bottom plate 34 of the compartment, making an electrical contact at pins 150; but as discussed hereafter, the voltage between pins 150 and clips 151 which supply them from the transformer, is a very low voltage — of the order of 6 to 12 volts — so that no danger exists at that point. Because operation of the on-off switch which comprises contact arm 136 and pin 132 causes the supply of low-voltage power to clips 151 and thence to the circuit component 130 through pins 150, it is not necessary to provide an off-switch which would be either ganged or separately operable, on the circuit component 130. Other pins than pins 150 would also be provided on the circuit component 130 for phonograph pick-up leads, tuner leads, speaker output wires, etc. All would be of the solderless connection type, e.g., such as discussed hereafter, thereby eliminating the necessity of any soldering operation during the assembly of a phonograph record player. Certain other electrical considerations are also provided in the preferred embodiment of this invention, as shown in FIGS. 9 to 12.

There are, however, other mechanical features and electrical-mechanical features of the assembly of the phonograph record player shown in FIG. 1 and FIGS. 2 to 8 which function particularly to make the phonograph record player of this invention one which can be very easily and inexpensively produced and assembled. It will be noted in FIG. 1 that the base compartment 33 has a circular rim 37 which fits into a suitable opening in the deck 39, or may be supported thereby. A pair of wings 41 may be formed in the vertical wall 43 of the base compartment 33, where the wings face upwardly and outwardly so that the entire assembly may be slipped through a suitable opening in the deck 39 and secured thereto by the interference of the upper ends of the wings 41 with the undersurface of the deck 39.

Assembly of the phonograph record player according to this invention is such that all of the high voltage — i.e., line voltage wiring is within the closed compartment formed by the base compartment 33 and the turntable 12 when assembled and the only wiring external thereto may be the speaker leads from the amplifier, the leads from the tone arm to the preamplifier, and any other power leads which may be taken from low voltage pins 150 and clips 151. The high voltage and low voltage wiring are thereby separated, and as well, the chances or liklihood of hum pick-up by the leads from the tone arm may be greatly reduced because of the physical separation of those leads from the power leads, the motor and the primary side of the transformer. It is evident that all of the components may be assembled into the base compartment 33 without the necessity for special jigs or fixtures, because they are supported thereby.

In addition, it will be noted that the circular shape of the base compartment 33 and the vertical bridge 45 which forms the deeper well into which the motor and transformer are assembled, provide a mechanical structure having great strength so that comparatively thin walls may be formed. Material costs may therefore be reduced, and cycle times in injection moulding machines may also be reduced because of the faster cooling.

Because the motor 14 is mounted form below, variations in the thicknesses of the motor laminations do not affect the vertical positioning of the portions 15 and 17 of the motor shaft 16, so that tolerances with respect to the positioning of the idler wheel 18 relative to the motor shaft 16 may be made very much tighter. This is because the motor shaft length can be predetermined, and when the motor is supported from the bottom rather than hung from above, the upper end of the motor shaft is always in the same position relative to the support; whereas when the motor is hung from above, variations in the thickness of the motor laminations create variations in the distance at which the end bearing of the motor is located from its support. Indeed, it is possible to reduce the overall height of the motor assembly of a phonograph record player according to this invention by eliminating the upper bearing, since all the support for the motor comes from below.

Figure 9:
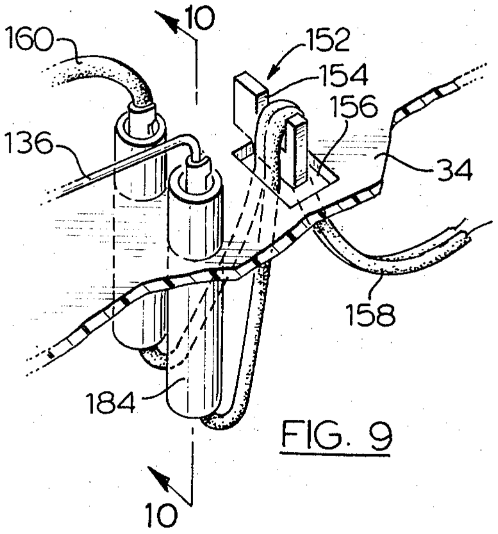
FIG. 9 is a partial, perspective view of typical solderless connections according to this invention, and a strain relief device for a line power cord.
Figure 10:
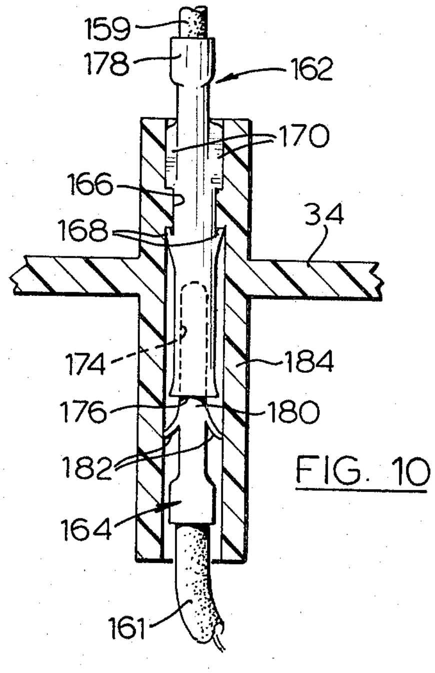
FIG. 10 is a cross-sectional view taken in the direction of arrows 10—10 in FIG. 9.

Turning to FIGS. 9 and 10, there is shown a strain relief arrangement for a line voltage power cord, and a solderless connector. The strain relief includes a clip 152 upstanding from the bottom plate 34, and having a downwardly facing notch 154 formed in it. Clip 152 overlies an opening 156 formed in the bottom plate 34, and it will be noted that the line cord 158 extends upwardly through the opening 156 and through the notch 154 of clip 152 and thence downwardly again through the opening 156. The arrangement shown in FIG. 9 is such that strain relief of the line power cord 158 is provided, in that an outward pull of the line cord 158 away from the phonograph record playing apparatus according to this invention will not cause a separation of the line cord from the apparatus. The ends of the two wires of the line cord 158 that attach to the apparatus are connected to the contact arm 136 and an electrical wire 160 respectively; and it will be seen hereafter that the wire 160 connects through the primary winding of the transformer and a wire 134 to the pin 132. Between each of the ends of the line power cord 158 and wire 160 and contact arm 136, respectively, there is a solderless connection which is shown in greater detail in FIG. 10. That connection is formed having a first contact clip member 162 and a second contact clip member 164. The first contact clip member 162 is dimensioned so as to fit above and below a plate or shoulder portion 166 having a known thickness, and is mechanically assembled thereto. A pair of wings 168 is formed in the first contact clip member 162 to be spring biased upwardly and outwardly and a pair of tabs 170 is also formed in the member 162 so that the lower end of member 162 passes through an opening in the plate or shoulder 166 until an interference of the tabs 172 occurs, by which time the wings 168 have sprung outwardly and face upwardly so as to preclude upward motion of the clip 162 away from the plate 166. A socket portion 174 is formed at the bottom end of clip 162, having an open mouth 176; and suitable means 178 such as clamping tabs or a spade are formed at the upper end of the first contact clip member 162 for connection to the wire shown generally at 159.

The other wire to be connected, shown generally at 161, is connected to the second contact clip member 164, which has a pin 180 having a cross-sectional thickness which is sufficient to allow the pin 180 to enter into the socket portion 174 of clip member 162 and to be graspingly retained thereby. In addition, a pair of wings 182 can be formed on the member 164 so that, when the solderless connection is assembled into a tube such as that shown at 184, the wings 182 which are spring biased outwardly and downwardly from the plate or shoulder 166 contact the inner surface of the tube 184 and tend to preclude withdrawal of the clip 164 therefrom. Thus, a positive, solderless connection between two wires shown generally at 159 and 161 maybe made, where the connection is mechanically assembled at least against a plate or shoulder such as 166 and secured thereto between the tabs 170 and the wings 168; and that the solderless connection is substantially self-supporting, without additional spade clips and the like.

It will be realized, of course, that in the event that service to the electrical equipment including a solderless connection such as that illustrated in FIG. 10 may be required, the connection may be forced apart, even at the expense of having to replace the contact clip members or either of them, if they are damaged.

Figure 11:
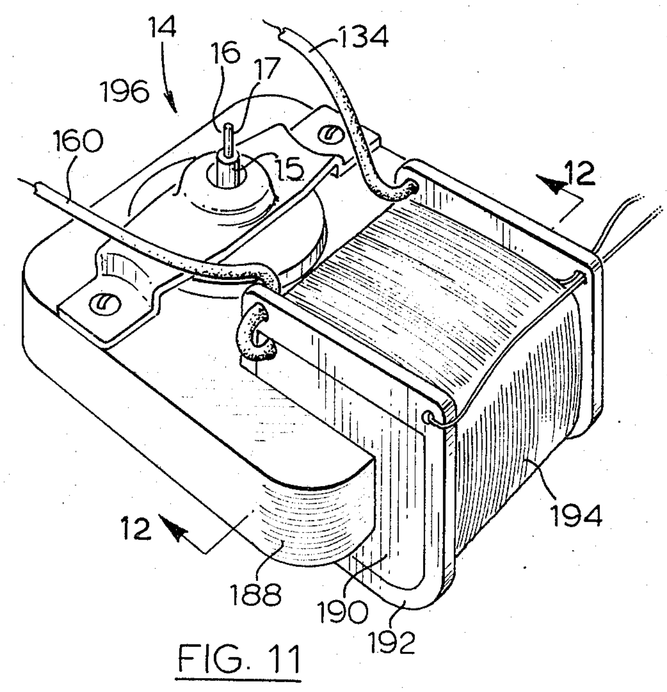
FIG. 11 is a partial, perspective view of a transformer structure and associated phonograph motor, in accordance with this invention.
Figure 12:
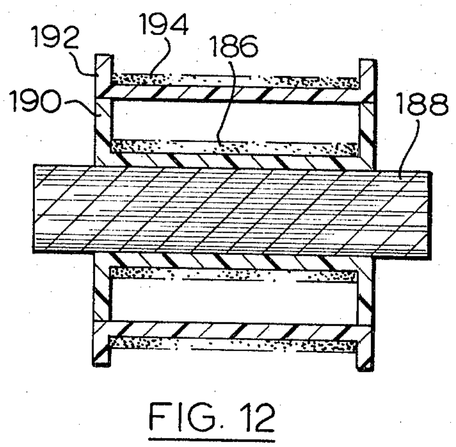
FIG. 12 is a cross-sectional view taken in the direction of arrows 12—12 in FIG. 11.

FIGS. 11 and 12 show a transformer structure which is such that the primary winding of the transformer is completely enclosed, so that only a low voltage winding is exposed. Thus, wires 160 and 134 connect to a primary winding 186, which is placed about a core 188, and is enclosed within spool ends 190. A bobbin 192 having a low voltage winding 194 thereon is placed over the transformer core 188; and the arrangement is such that there is an electromagnetic flux linkage between windings 186 and 194 so that a low voltage is inducted in winding 194 — the turns ratio between windings 186 and 194 having been chosen accordingly — and winding 194 is completely, electrically isolated from winding 186. Generally speaking, thevoltage induced in the low voltage winding 194 is of the order of 6 to 12 volts, sufficient to provide power to a preamplifier component. The bobbin construction of the transformer structure precludes the necessity to tape the primary winding 186.

In the structure shown in FIG. 11, the laminations of the core 188 of the transformer also form the stator frame 196 of the constant speed phonograph motor 14.

There has been described a phonograph record player apparatus having a speed changer assembly which automatically adjusts the driving speed of the turntable to one of two preselected speeds, depending upon the nature of the phonographic record which is placed thereon.

Assembly of a phonograph record player assembly according to this invention can be easily accomplished without the necessity of special jigs or fixtures. This is because the unit is essentially self-supporting within its own compartment. Even the phonograph motor 14 is supported from below, rather than being hung from a motorboard as in conventional record players, thereby permitting easy access and fewer assembly operations. When assembled, a record player such as that shown in FIG. 1, is essentially symmetrical, so that it may be placed in the most desirable position as required by a designer, with only the tone-arm and speakers (and tuner, if provided) external to the unit and requiring to be easily and quickly connected thereto.

A number of features of the apparatus have been discussed, and the advantages over the prior art apparatus explained. With the exception of the electrical contacts and the bias springs, all of the components of the apparatus illustrated and described may be formed from suitable injection moulding plastics, such as Celcon, Nylon, Delrin and Polypropylene. Alterations, amendments and alternative arrangements may be obvious to a person skilled in the art, but without departing from the spirit and scope of the appended claims.

I claim:

1. In an apparatus for playing phonograph records, where said apparatus includes a turntable driving apparatus having a constant speed motor with a vertically oriented motor shaft and horizontally disposed idler driven from said shaft to drive said turntable, the contact of said idler with said motor shaft and turntable being at the periphery of said idler in each case; said motor shaft having first and second sections of different diameter to cause said turntable to be driven at a first or second speed upon driving contact by said idler with the respective one of said first or second shaft sections, said first section being disposed below said second section; an improved speed changer for said turntable driving apparatus, comprising:

a horizontally disposed idler arm mounted for vertical movement from a first, lower, position to a second, higher, position said idler arm carrying said idler and having a bearing cam follower on the underside thereof;

a cam plate mounted for swinging movement in a horizontal plane from a first to a second position and having a ramp-type cam formed on its upper surface and positioned for contact with the bearing cam follower on the underside of said idler arm, a shoulder portion on said cam plate disposed at a first elevation and to one side of the axis of rotation of said turntable, and a nose portion on said cam plate disposed at a second elevation below said first elevation and remote from said shoulder portion; and a control element having a dog formed on the underside thereof, said control element being mounted for rotation with said turntable and for vertical movement from a first, higher, position to a second, lower, position;

said dog being adapted to orbit around the axis of rotation of said turntable at a first elevation being the elevation of said shoulder portion of said cam plate when said control element is in its first position, and at a second elevation being the elevation of said nose portion of said cam plate when said control element is in its second position;

said idler arm being biased downwardly so that said bearing cam follower bears constantly against said ramp-type cam;

the first position of said cam plate being such that said dog and said nose portion interfere if said control element is in its second position, so that continued orbital movement of said dog about the axis of rotation of said turntable causes said cam plate to swing to its second position; and said first position of said cam plate being such that said idler arm and idler are in their respective first positions, and no interference of either said nose or said shoulder portion occurs when said control element is in its first position;

the second position of said cam plate being such that said dog and said shoulder portion interfere if said control element is in its first position, so that continued orbital movement of said dog about the axis of rotation of said turntable causes said cam plate to swing to its first position; and said second position of said cam plate being such that said idler arm and said idler are in their respective second positions, and no interference of either said shoulder or said nose portion occurs when said control elements is in its second position;

a control shaft being mounted for rotation independently of said turntable at the axis of rotation of said turntable, said control shaft being mechanically coupled to an electrical on-off switch for said turntable apparatus;

where a rotary cam is secured to said control shaft, said rotary cam having a first "off" cam position and a second "on" cam position, and a cam follower is mounted for horizontal movement against a post on the underside of said idler arm; and including an electrical contact arm biased towards a second electrical contact and towards said idler arm; so that when said rotary cam is rotated and the cam follower is no longer against said first cam position, said contact arm moves against said idler arm causing swinging movement thereof and sliding movement of said cam follower until said contact arm touches said second electrical contact.

2. The turntable speed changer of claim 1 wherein said control shaft is mechanically connected to electrical control circuitry for said turntable apparatus.

3. The turntable speed changer of claim 1, where said control element is dimensioned to fit into the centre hole of phonograph records intended for playing at a first speed and is too large for the centre hole of phonograph records intended to be played at a second speed; and said control element is biased upwardly to its first position and moveable downwardly to its second position under the weight of a phonograph record intended to be played at said second speed.

4. The turntable speed changer of claim 1 where said control element is biased upwardly to its first position and moveable downwardly to its second position only under the weight of a phonograph record intended to be played at said second speed.

5. The turntable speed changer of claim 1 wherein said cam plate is biased to remain in either of said first or second positions, and interference of said dog with either of said nose or shoulder portions of said cam plate causes an overcentre swinging movement of said cam plate to the other of said first or second positions.

6. The turntable speed changer of claim 1 where said idler arm is biased for swinging movement so as to urge said idler towards said motor shaft, and said second position of said rotary cam is dimensioned so as to allow sufficient swinging movement of said idler arm post against said cam follower and sufficient movement of said cam follower that said idler is moved into driving contact with said motor shaft.

7. The turntable speed changer of claim 6 where a third cam position is on said rotary cam between said first and second cam positions, and is dimensioned so as to allow only sufficient swinging movement of said contact arm to touch said second electrical contact.

8. The turntable speed changer of claim 2, where said control shaft is mounted for rotatable driving cooperation with a rotatable electrical control element of a preamplifier component of said phonograph record playing apparatus.

9. In an apparatus for playing phonograph records, where said apparatus includes a turntable driving apparatus having a constant speed motor with a vertically oriented motor shaft and a horizontally disposed idler driven drom said shaft to drive said turntable, the contact of said idler with said motor shaft and turntable being at the periphery of said idler in each case; said motor shaft having first and second sections of different diameter to cause said turntable to be driven at a first or second speed upon driving contact by said idler with the respective one of said first or second shaft sections, said first section being disposed below said second section, and a speed changer for said turntable driving apparatus to position said idler with respect to the desired one of said first and second sections of said motor shaft; an improved control assembly, comprising:

a control shaft mounted for rotation independently of said turntable at the axis of rotation thereof;

the greatest crosswise dimension of the upper end of said control shaft being not greater than the smallest centre-hole of a phonograph record intended to be placed on said apparatus;

said phonograph motor and said control shaft being each independently supported from a base;

said control shaft having an index and being mounted for rotation relative to a stationary marker ring, having indicia thereon;

said control shaft having a rotary cam secured thereto, said rotary cam having a first "off" cam position and a second "on" cam position, said stationary marker ring being mounted with respect to said control shaft so that an electrical switch is in its "off" position when said rotary cam is rotated against a cam follower and the cam follower is against the "off" cam position, said index on said control shaft being at that time opposite an appropriate indicium on said marker ring;

an idler arm having a post formed thereon and urged against said cam follower; and a stationary pin and a contact arm biased towards said stationary pin and being the elements of an electrical switch, said contact arm being positioned relative to said idler arm so that when said cam follower is against the "off" cam position, said idler arm is pushed against contact arm and said contact arm is out of contact with said stationary pin, said electrical switch thereby being open.

10. The apparatus of claim 9 where said base and said turntable, when assembled, form a substantially closed compartment; and where all electrical connections of electrical wires intended to be operated at line voltage are made within said enclosed compartment.

11. The apparatus of claim 9, where a third cam position is on said rotary cam between said first and second cam positions, and includes a detent against which said cam follower may move;

and an indicium on said marker ring in the place opposite said index when said control shaft is rotated so that said cam follower is against said third cam position.

* * * * *